(No Model.)
A. A. KING.
PNEUMATIC TIRE.
No. 543,386. Patented July 23, 1895.
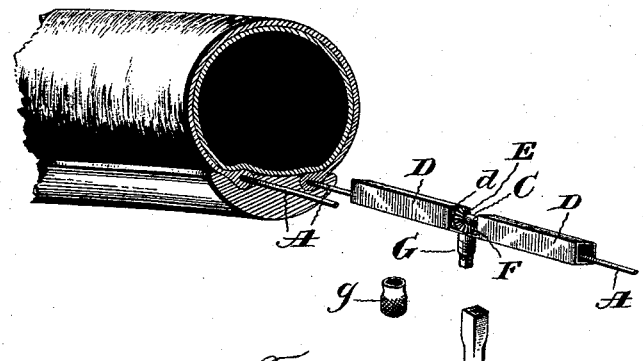
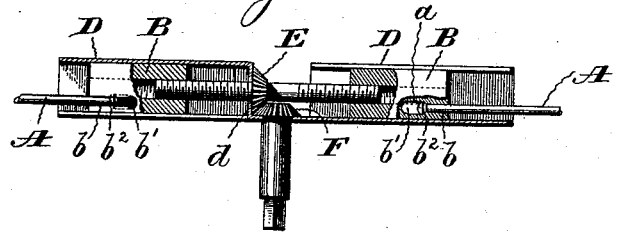
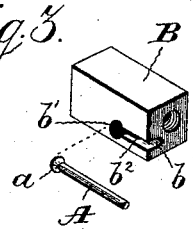 
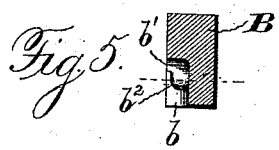
Witnesses:
Jas. E. Hutchinson.
Henry C. Hazard.
Inventor.
Arthur A. King
by Prindle and Russell
his Attorneys

UNITED STATES PATENT OFFICE.

ARTHUR A. KING, OF AURORA, ILLINOIS.

PNEUMATIC TIRE.

SPECIFICATION forming part of Letters Patent No. 543,386, dated July 23, 1895.

Application filed March 28, 1895. Serial No. 543,483. (No model.)

*To all whom it may concern:*

Be it known that I, ARTHUR A. KING, of the city of Aurora, in the county of Kane, and in the State of Illinois, have invented certain new and useful Improvements in Pneumatic Tires; and I do hereby declare that the following is a full, clear, and exact description thereof, reference being had to the accompanying drawings, in which—

Figure 1 is a perspective view of a portion of a pneumatic tire with my fastener applied. Fig. 2 is a longitudinal section through the fastener; Fig. 3, a detail perspective view of one of the end portions of a wire and its block. Figs. 4 and 5 are detail views, in section, of the block.

Letters of like name and kind refer to like parts in each of the figures.

The object of my invention is to enable a pneumatic tire to be securely fastened to the wheel-rim, so as to be held firmly against movement relative to the rim, and to this end my invention consists in the fastening means employed, substantially as and for the purpose hereinafter specified.

My invention relates to the class of tire-fasteners in which two circumferential wires are employed that are attached to the inner edges of the outer cover and serve to secure the same and the inclosed air-tube to the wheel-rim. Various devices have been used to connect and draw together the free ends of each of said wires, but none, as far as I am aware, have been efficient to draw the wire so tightly as to securely hold the tire from creeping or moving upon the rim. It has been my aim to produce a fastener, or connection between the ends of the wire, which will enable the latter to be tightened to the required degree, so as to effectually clamp the tire to the rim, and in the carrying of my invention into practice I attach to each end of each wire A a block B and connect the two blocks B and B by means of a shaft C, whose opposite end portions are provided with right and left hand screw-threads, respectively, that engage each a correspondingly-threaded opening in the block. Rotation of said shaft in one direction will simultaneously move the two blocks B and B toward each other, while its rotation in an opposite direction will cause them to move away from each other. Each block B is placed within a light metal casing D, and the block and said casing are given such shape in cross-section (being preferably rectangular) that the block cannot rotate when the threaded shaft is revolved, but is compelled to move longitudinally. The block-casings D and D are connected together at their inner ends by a piece $d$. Near its longitudinal center, between its threaded portions, the shaft C has fixed upon it a bevel-pinion E, and meshing with the same is a similar pinion F that is mounted upon the outer end of a short shaft G, which projects inward through an opening in the casing, connecting piece $d$ and an opening in the wheel-rim, and at its inner end is squared to receive a key by which said shaft may be rotated.

My wire connecting and tightening device is applied and used in the following-described way: The wire A having been applied to the tube cover in the usual way, a block B is attached to each free end thereof, and, being placed within its casing D, is connected to the shaft C by a few turns thereof to engage its thread with the thread of the block. The device is now placed in position upon the wheel-rim with the key-shaft G extending inward through the latter, and the edges of the cover being properly tucked down into said rim, the key is applied to the squared end of the shaft G and the latter rotated in the direction necessary to draw the blocks B and B toward each other. As each block B pulls upon the wire the latter is moved positively both ways, and as a result is so tightly drawn around the wheel-rim that it most securely holds the tire thereto and effectually prevents slipping or creeping.

The wire ends may be connected to the blocks in any suitable way, as by threading the wire ends and screwing the blocks thereon, or each wire may be formed with a head or knob $a$, as shown in Fig. 3, and the block be provided with a slot $b$ into which the wire can be placed, the slot having an enlargement $b'$ at its inner end for the passage of the head $a$, and being provided with a shoulder $b^2$ between its ends for said head to engage.

As the head $a$ can only pass through the enlargement $b'$, the wire, when its head engages the shoulder $b^2$, is securely held from accidental separation from the block.

To protect the squared end of the shaft G when the key is not upon the same, a cap $g$ may be placed thereon, said shaft being provided with thread, as shown, to engage a threaded portion of the cap.

Having thus described my invention, what I claim is—

1. As a means for fastening tires to wheel rims, the combination of a wire extending circumferentially around the rim, a block connected to each end of said wire, a shaft having right and left hand screw threaded portions each of which engages a threaded opening in a block having a flat side, means to rotate said shaft, and a surface engaging the flat side of each block to hold the same from rotating as the shaft is revolved, substantially as and for the purpose specified.

2. As a means for fastening tires to wheel rims, the combination of a wire extending circumferentially around the rim, a block connected to each end of said wire, a shaft having right and left hand, screw-threaded portions, each of which engages a threaded opening in a block, a casing for each block that permits the same to slide but not to rotate, and means to rotate said shaft, substantially as and for the purpose set forth.

3. As a means for fastening tires to wheel rims, the combination of a wire extending circumferentially around the rim, a block connected to each end of said wire having flat sides, a shaft having right and left hand screw threaded portions, each of which engages a threaded opening in a block, a casing for each block, engaging the flat sides thereof to hold the same from rotating a bevel pinion on said shaft, and an operating shaft having a pinion meshing with that upon the threaded shaft, substantially as and for the purpose described.

In testimony that I claim the foregoing I have hereunto set my hand this 27th day of February, 1895.

ARTHUR A. KING.

Witnesses:
G. W. AVERY,
E. T. PRINDLE.